(12) United States Patent
Minh

(10) Patent No.: US 7,893,692 B2
(45) Date of Patent: Feb. 22, 2011

(54) METHOD FOR ESTIMATING THE FORMATION PRODUCTIVITY FROM NUCLEAR MAGNETIC RESONANCE MEASUREMENTS

(75) Inventor: Chanh Cao Minh, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 123 days.

(21) Appl. No.: 12/263,570

(22) Filed: Nov. 3, 2008

(65) Prior Publication Data

US 2010/0109664 A1 May 6, 2010

(51) Int. Cl.
*G01V 3/00* (2006.01)
(52) U.S. Cl. .................................. 324/303; 324/300
(58) Field of Classification Search ................. 324/303, 324/300
See application file for complete search history.

(56) References Cited

U.S. PATENT DOCUMENTS

| | | | | |
|---|---|---|---|---|
| 4,413,512 A | 11/1983 | Zemanek | | |
| 6,072,314 A * | 6/2000 | Oraby | ......................... | 324/303 |
| 7,224,162 B2 * | 5/2007 | Proett et al. | .................. | 324/303 |
| 7,388,374 B2 | 6/2008 | Minh et al. | | |
| 7,486,070 B2 * | 2/2009 | Madio et al. | ................. | 324/303 |
| 7,675,287 B2 | 3/2010 | Minh | | |
| 2009/0189604 A1 * | 7/2009 | Romero | ...................... | 324/303 |

OTHER PUBLICATIONS

Heaton, N. et al., Applications of a New-Generation NMR Wireline Logging Tool, SPE 77400, Sep. 29-Oct. 2, 2002, San Antonio, Texas, pp. 1-10.
Minh, Chanh et al., Using the Continuous NMR Fluid Properties Scan to Optimize Sampling with Wireline Formation Testers, SPE 115822, Denver, CO, Sep. 21-24, 2008, pp. 1-14.

* cited by examiner

*Primary Examiner*—Louis M Arana
(74) *Attorney, Agent, or Firm*—Shaun Sethna; Darla Fonseca; Charlotte Rutherford

(57) ABSTRACT

A method for estimating fluid productivity of a subsurface rock formation from within a wellbore drilled therethrough includes measuring a nuclear magnetic resonance property of the formation at a plurality of lateral depths therein. The measured nuclear magnetic resonance property is used to estimate the fluid productivity.

11 Claims, 2 Drawing Sheets

METHOD FOR ESTIMATING THE FORMATION PRODUCTIVITY FROM NUCLEAR MAGNETIC RESONANCE MEASUREMENTS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of subsurface rock formation productivity estimation. More specifically, the invention relates to methods for determining expected fluid production from nuclear magnetic resonance measurements.

2. Background Art

Wellbores are drilled through subsurface rock formations to extract useful substances such as oil and gas. A wellbore forms a hydraulic conduit from a permeable subsurface rock formation having oil and/or gas present therein to the Earth's surface. Oil and/or gas typically move to the surface through the wellbore by the force of gravity. Gravity manifests itself as a pressure drop between the fluid pressure in the pore spaces of the subsurface rock formation and the wellbore. The rate at which the oil and/or gas move into the wellbore and to the surface depends on the pressure drop between the formation and the wellbore, the viscosity of the oil and/or gas, and the permeability of the rock formation to the oil and/or gas.

The relative volumes of gas, water and oil that flow from a particular rock formation depend not only on the pressure differential between the formation and the wellbore, but also on the relative permeability of the rock formation to each of the respective fluids and the viscosity of the fluids. In combination, the viscosity and relative permeability define a property of a fluid in a permeable formation known as the fluid mobility. Because of capillary pressure effects, mobility of a particular fluid is also dependent on the fractional volume of the pore space occupied by the fluid and on the pore structure of the pore space in the particular rock formation. It is desirable to be able to determine fluid mobility and likely fluid production rates of gas, oil and/or water from subsurface rock formations in order to estimate the economic value of the rock formation for its possible hydrocarbon production.

It is known in the art to estimate productivity by various forms of fluid sample extraction and production testing. The foregoing productivity estimating techniques require extensive use of equipment, even installation of pipe or casing into the wellbore for accurate testing. There exists a need for productivity estimation using non-invasive, quick and convenient well logging techniques,

SUMMARY OF THE INVENTION

A method according to one aspect of the invention for estimating fluid productivity of a subsurface rock formation from within a wellbore drilled therethrough includes measuring a nuclear magnetic resonance property of the formation at a plurality of lateral depths therein. The measured nuclear magnetic resonance property is used to estimate the productivity.

A method for subsurface formation evaluation according to another aspect of the invention includes moving a well logging instrument along a wellbore drilled through subsurface rock formations. While moving the instrument along the wellbore, a nuclear magnetic resonance property of the formation is measured at a plurality of lateral depths into the formations. The measuring the property includes inducing a static magnetic field in the formations, inducing a pulsed radio frequency magnetic field in the formations at a plurality of different selected frequencies and measuring radio frequency energy from the formation induced by nuclear magnetic resonance phenomena at each of the selected frequencies. The measured nuclear magnetic resonance property is used to estimate a fluid productivity of the subsurface rock formations.

Other aspects and advantages of the invention will be apparent from the following description and the appended claims.

DETAILED DESCRIPTION

Figure 1:
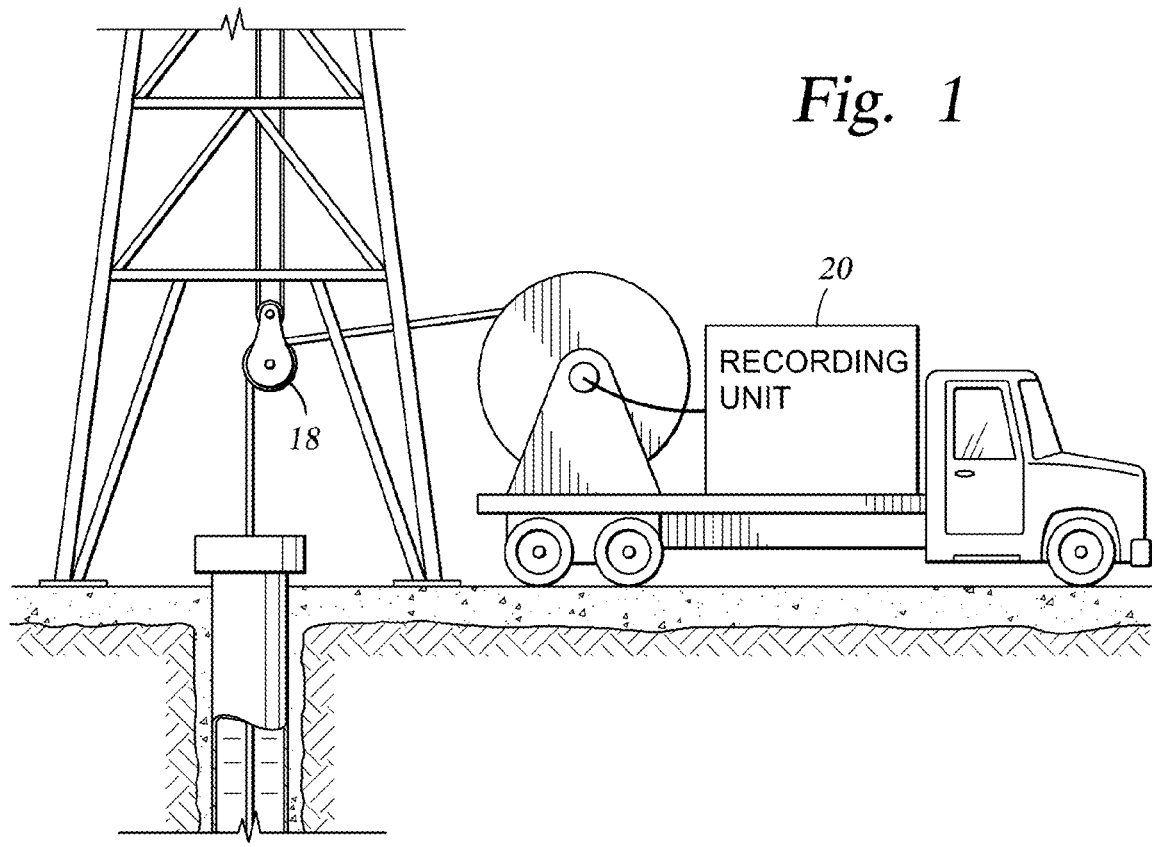
FIG. 1 shows an example of a nuclear magnetic resonance well logging instrument moved through a wellbore drilled through subsurface rock formations.
Figure 1:
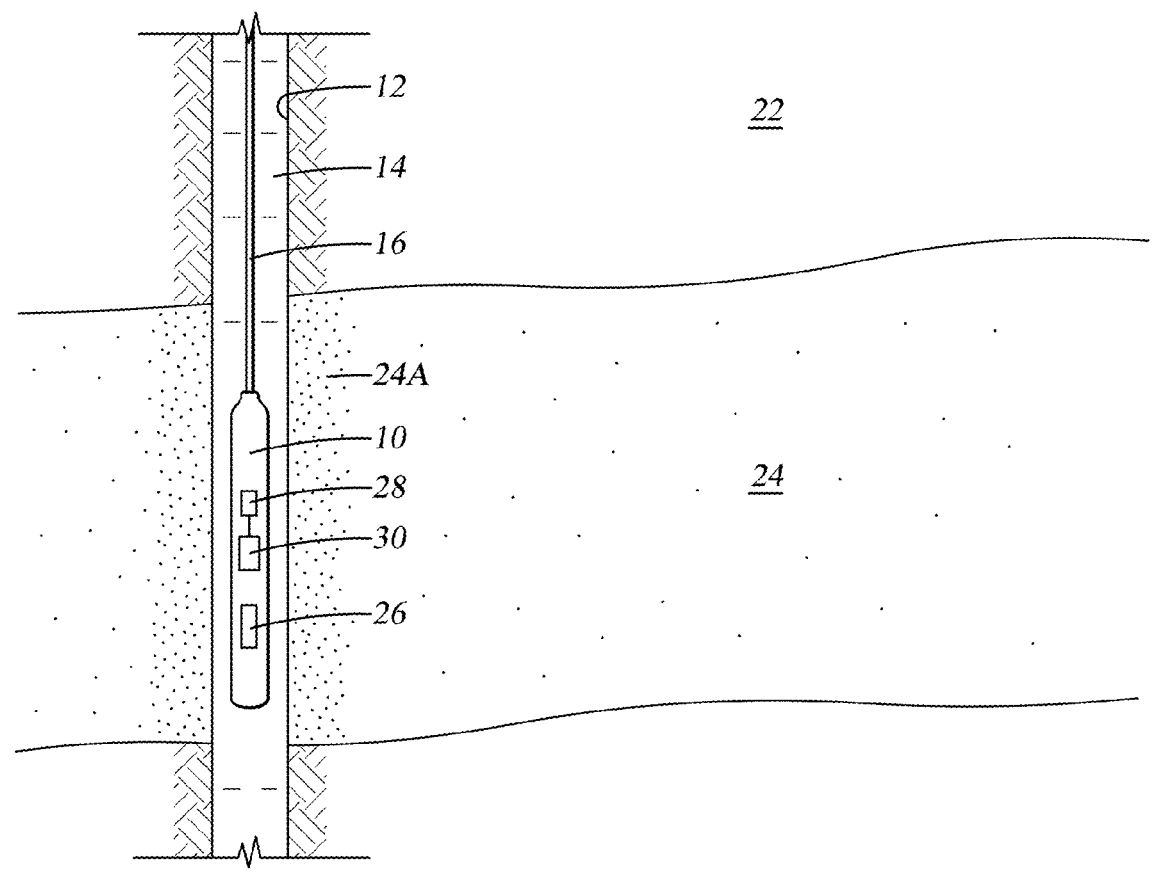

FIG. 1 shows an example of a nuclear magnetic resonance ("NMR") well logging instrument 10 being moved along a wellbore 12 drilled through subsurface rock formations 22, including one or more permeable rock formations 24. The instrument 10 may be moved along the interior of the wellbore 12 at the end of an armored electrical cable 16 ("wireline") deployed by a winch 18 or similar device known in the art. The instrument 10 may be in signal communication with a "recording unit" 20 at the Earth's surface, which may include systems (not shown separately for clarity of the illustration) for providing electrical power to operate the instrument 10, to receive and decode signals from the instrument 10 and to make a recording, indexed with respect to depth of the instrument 10 in the wellbore 12, or indexed with respect to time, of the signals transmitted from the instrument 10 to the recording unit 20.

While wireline deployment is shown in FIG. 1, it is to be clearly understood that such deployment is only one example of possible deployment of an instrument that may be used with the invention. Other deployment devices that may be used include, without limitation, deployment in or on a string of drill pipe, on a coiled tubing, at the end of "slickline" (single, solid strand wire or cable), in or on a production tubing, casing or other tubular device known in the art. Such deployment may be made while the wellbore 12 is being drilled (logging while drilling) or thereafter (logging while tripping or other conveyances including wireline and slickline).

The wellbore 12 may include drilling mud 14 or similar fluid used during the drilling of the wellbore 12. In certain cases, the drilling mud 14 may interact with certain permeable formations (e.g., formation 24) so as to affect permeability of the formation proximate the wellbore 12. Such permeability-affected zone is indicated as a "damaged zone" at 24A and may have lower permeability than the remainder of the formation 24 laterally more distant from the wellbore 12. In methods according to the invention, measurements made by the well logging instrument 10 may be used to determine formation permeability at several different lateral distances from the wellbore wall into the formation 24, and such determinations may be used to estimate the amount of and the lateral extent of such damage as well as the permeability of the formation 24 beyond the lateral depth of any damage. The measurements made by the instrument may also be used to estimate the rate at which fluids such as oil, gas and water will be produced from the permeable formations (e.g., formation 24).

The well logging instrument 10 is configured to make NMR measurements, and may include a magnet 26 such as an electromagnet or permanent magnet to prepolarize susceptible atomic nuclei in the formation 24, typically hydrogen, along the direction of the magnetic field induced by the magnet 26. The instrument 10 may include one or more radio frequency ("RF") antennas, e.g., as shown at 28 coupled to suitable energizing and detecting circuitry 30 to induce NMR phenomena in the formation 24 and to detect NMR phenomena from within the formation 24. The detected NMR phenomena can be used to determine, for example, permeability of the formation at a plurality of lateral distances from the wellbore wall.

The instrument 10 may be one that is used to provide formation evaluation services under the service mark MR SCANNER, which is a service mark of the assignee of the present invention. Irrespective of the particular instrument used in various examples, the instrument 10 should be capable of making NMR measurements from within a plurality of different selected sensitive volumes each of which is located at a different lateral depth into the permeable formation 24 from the wall of the wellbore. Examples of instrument configuration capable of making such measurements can include having the magnet configured to induce a static field having known amplitude distribution in the formation. The frequency of the RF magnetic field may be selected to excite the susceptible nuclei (e.g., hydrogen) in various regions in the formation depending on the amplitude distribution of the static magnetic field. In one example, a plurality of different RF magnetic field frequencies is used, each one inducing NMR phenomena in a different sensitive volume as a result of the amplitude distribution of the static magnetic field. Typically the RF magnetic field is oriented to be substantially orthogonal to the static magnetic field at least in the various sensitive volumes.

The pulsed RF magnetic field may include a first pulse of selected amplitude and duration to, for example, transversely realign (rotate, e.g., 90 degrees) the magnetic spin axes of the susceptible nuclei, followed, after a selected time interval, by a plurality of pulses spaced apart in time from each other by the same time interval, and having amplitude and duration selected to invert the magnetic spin axes of the susceptible nuclei by a selected angle (e.g., 180 degrees). After each such reorientation pulse, NMR spin echo signals may be detected. One such RF pulsing and signal detection sequence is the well known Carr-Purcell-Meiboom-Gill sequence. Amplitude of each NMR spin echo signal so detected may be related to the nuclear magnetic relaxation properties of the formation at each of the selected lateral depths into the formation. One non-limiting example of an NMR property that may be determined using such RF pulsing and measurement sequences is the transverse relaxation time ($T_2$). Another property that may be measured using such RF pulsing and detecting sequences is longitudinal relaxation time ($T_1$). If the magnetic field induced by the magnet has suitable amplitude gradients, it is also possible to measure the self diffusion constant (D) of the formation at various lateral depths from the wellbore.

Figure 2:
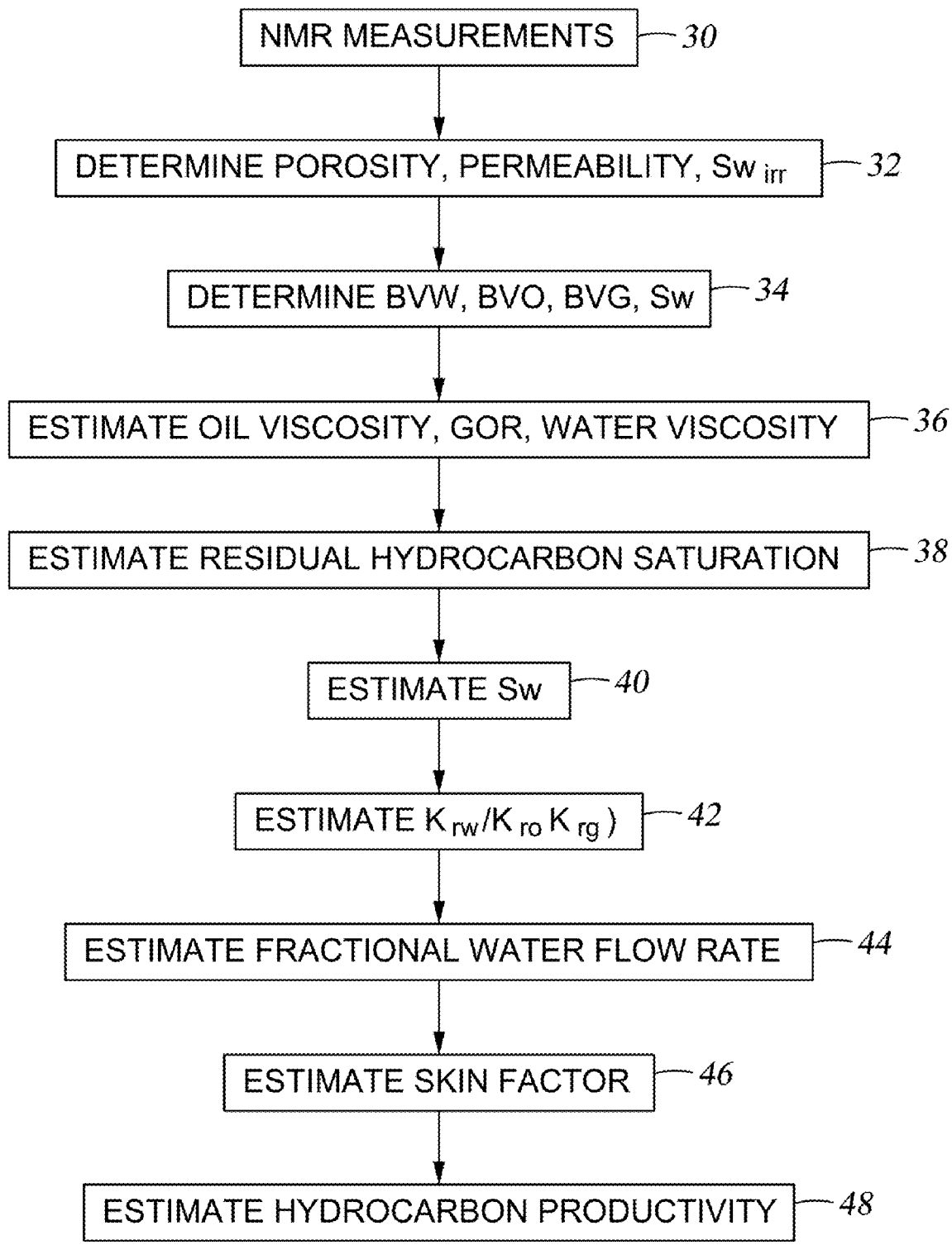
FIG. 2 shows a flow chart of one example method according to the invention.

Having explained in general terms types of NMR measurements that may be used in various examples, a process for estimating fluid productivity from the formation will now be explained. Referring to FIG. 2, a flow chart of the procedure is shown in general terms. The elements of the flow chart shown in FIG. 2 will be explained as appropriate in more detail with reference to each such element. At 30, NMR measurements including transverse relaxation time, longitudinal relaxation time and self diffusion constant measurements are made, for example as explained with reference to FIG. 1. At 32, the NMR measurements, in particular the transverse relaxation time measurements, may be used to estimate or determine the fractional volume of rock formation pore space ("porosity"), the formation permeability and the minimum fractional volume of the rock pore space that can be occupied by water as a result of surface tension and capillary pressure effects. Such fractional volume is known as the irreducible water saturation ($Sw_{irr}$). Examples of techniques for calculating porosity, permeability and irreducible water saturation are described in Heaton N. et al., *Applications of a New-Generation NMR Wireline Logging Tool*, paper no. 77400, Society of Petroleum Engineers, Richardson, Tex. (2002). Permeability of the formations from the NMR measurements may also be calculated, for example, using either of equations (5) or (6) explained below.

At 34, bulk volumes of water (BVW), of oil (BVO) and of gas (BVG), and the fractional volume of the rock pore space (referred to as "saturation") occupied by each such fluid may be determined by using transverse relaxation time and self-diffusion constant NMR measurements. See, for example, U.S. Pat. No. 7,388,374 issued to Minh et al. and assigned to the assignee of the present invention for a description of applicable techniques for making such fluid volume determinations. Generally, such determination of fluid volumes and saturations includes determining a multi-dimensional distribution of the NMR measurements by inversion that is independent of any prior knowledge of fluid sample properties. The multi-dimensional distribution can be, for example, visually displayed on a multi-dimensional map, such as a $D$-$T_2$ map. Each fluid instance or artifact visible on such a display can be identified as representing a probable existence of a particular fluid (i.e., gas, oil and/or water). Once an artifact has been selected from the map, the fluid volume and saturation can be calculated by integrating over the selected region of the $D$-$T_2$ map. Integration over the total $D$-$T_2$ map area provides the total porosity, therefore individual fluid saturations can be computed by dividing the fluid volumes by the total porosity.

At 36, the oil viscosity, gas-oil ratio and water viscosity can be estimated. Oil viscosity can also be estimated, for example, using D-T2 maps. Gas volume and gas-oil ratio may be determined, for example using D-T1 maps or combinations of D-T1 and D-T2 maps. Viscosity of connate water may be estimated using known empirical relationships of water viscosity with respect to temperature (which may be estimated from local gradients or may be measured) and salinity (which may be measured or may be inferred by other measurements such as electrical resistivity). Example techniques for determining fluid viscosity from NMR measurements are described in Cao Minh C. et al. *Using the Continuous NMR Fluid Properties Scan to Optimize Sampling with Wireline Formation Testers*, Paper No. 115822, Society of Petroleum Engineers, Richardson, Tex. (2008).

At 38, residual oil and gas saturations (the fractional volume of oil and gas remaining in the rock pore spaces after substantial displacement by the liquid phase of the drilling fluid) are estimated. Such residual saturations may be estimated, for example, by estimating a bound water volume, a total porosity and a free water volume at each of the investigated lateral depths from the nuclear magnetic resonance measurements. A minimum water saturation can then be estimated at each lateral depth from the total porosity, the free water volume and the bound water volume determined from the NMR measurements corresponding to each lateral depth. A value of water saturation is then estimated at each lateral depth from the minimum water saturation determined at each lateral depth. A relationship between lateral depth and water saturation can be determined using the foregoing values of water saturation determined for each lateral depth. Based on the foregoing relationship, a water saturation can be estimated for the so-called "flushed zone" wherein substantially all mobile connate fluid has been displaced by the liquid phase of the drilling fluid. Frequently the flushed zone extends to the shallowest lateral depth of investigation of the above described MR SCANNER instrument. The foregoing flushed zone water saturation can then be used to estimate the residual hydrocarbon (oil and gas) saturation in the flushed zone.

Using the foregoing technique of radial profile investigation of NMR properties, at 40, the fractional volume of pore space occupied by connate water in the undisturbed or "uninvaded" part of the formation may be determined. Such fractional volume is referred to as the water saturation (Sw). Such Sw determination may be made, for example, by using the foregoing radial profile of water saturation at each of the lateral depths of investigation to estimate water saturation at a selected lateral depth greater than the greatest lateral depth of the nuclear magnetic resonance measurements. Note that Sw might also be obtained from other sources, for example electrical resistivity measurements.

Having estimated the fractional volumes of fluids, the irreducible water saturation, the uninvaded zone water saturation and the residual oil and gas saturations, at 42, the relative permeabilities of each of the water, oil and gas may be determined. In some examples, relative permeabilities may be estimated using modified forms of empirical relationships known as the Corey relationships. See, for example, Johnson, Jr., C., *Graphical Determination of the Constants in the Corey Equation for Gas-Oil Relative Permeability Ratio*, paper no. 2346, Society of Petroleum Engineers, Richardson, Tex. (1968) and X. Sun et al., *Estimation of Flow Functions During Drainage Using Genetic Algorithm*, paper no. 84548, Society of Petroleum Engineers, Richardson, Tex. (2005). Such modified Corey relationships may be implemented using the following expressions:

$$k_{rw} = \left(\frac{(Sw - Sw_{irr})(1 - Sor)}{1 - Sw_{irr} - Sor}\right)^3 \quad (1)$$

$$k_{ro} = \left(\frac{(1 - Sw - Sor)^3(2(1 - Sw) + Sw + Sor\_2Sw_{irr})}{(1 - Sw_{irr} - Sor)^3}\right) \quad (2)$$

$$k_{rg} = \left(\frac{(1 - Sw - Sgr)^5(Sw + 1 - Sgr - 2Sw_{irr})}{(1 - Sw_{irr} - Sgr)^5}\right) \quad (3)$$

After calculating or estimating the relative permeabilities of each of the oil, gas and water, at 44, a fractional amount of water (Fw) of the total amount of produced fluid that may be expected to move from the permeable formation (24 in FIG. 1) into the wellbore may be estimated using an expression such as the following:

$$Fw = \frac{1}{1 + \frac{\eta_w k_{ro}}{\eta_o k_{rw}}} \quad (4)$$

At 46, a property of the damaged zone (24A in FIG. 1) called the "skin effect" may be estimated. Skin effect may be determined by estimating permeability at a plurality of lateral depths into the formation from the wellbore and thereby determining a relationship of permeability with respect to the lateral depth from the wellbore. The same relationship may be used to estimate the formation permeability in the unaffected or undamaged part of the formation, generally laterally distal from the wellbore. Two example relationships can be used to convert the determined transverse relaxation times in the NMR measurements to permeability. These are the Schlumberger-Doll Research ("SDR") relationship:

$$k_{SDR} = A(\emptyset_{NMR})^4 (T_2 \log \text{mean})^2 \quad (5)$$

and the Timur ("BWP") relationship which is based on irreducible water volume:

$$k_{BWP} = A(\emptyset)^4 [(\emptyset - BV_{irr})/BV_{irr}]^2 \quad (6)$$

where $k_{BWP}$ is bulk water permeability, BVirr is bulk volume of irreducible water, which may be determined from, for example, NMR $T_2$ measurements, and $\emptyset$ represents porosity. The porosity may be determined, for example, from the NMR measurements as explained above. Thus, from the NMR measurements made at each lateral depth into the formation, a corresponding value of permeability may be estimated or determined. The permeability values at each lateral depth may be used to estimate the skin factor. Skin factor (S) may be represented by the following expression:

$$S = (K/K_s - 1)\ln(r_s/r_w) \quad (7)$$

wherein K represents the undamaged or native formation horizontal permeability, Ks represents the damaged zone horizontal permeability, $r_s$ represents the radius of the damaged zone (e.g., 24A in FIG. 1) from the center of the wellbore, and $r_w$ is the radius of the wellbore For the MR SCANNER well logging instrument described above, for example, NMR measurements are made at lateral depths of 1.5 inches (38 mm), 2.7 inches (68 mm) and 4 inches (101 mm) into the formation from the wall of the wellbore. The concept of pseudo-wellbore radius, r'w caused by skin effect may be represented by the expression:

$$r'_w = r_w e^{-s} \quad (8)$$

Thus, after computing S for the shallower depth of investigation ("DOI") NMR measurements, the above equation can be used to estimate r'w. Skin factor for successively larger DOI measurements can then be calculated by substituting $r_w$ in equation (7) with r'w determined from equation (8). The foregoing may be repeated for each set of successively larger DOI NMR measurements.

If the deepest (4 inch for the MR SCANNER instrument described above) DOI measurements provide the undamaged formation horizontal permeability (as often occurs in practice), then the skin factors for smaller DOI measurements (e.g., 1.5 inch and 2.7 inch DOI for the MR SCANNER instrument) can be computed as follows:

$$S_{1.5}=(K_4/K_{1.5}-1)\ln(1+1.5/r_w) \quad (9)$$

$$r'_{w,1.5}=r_w e^{-S_{1.5}} \quad (10)$$

$$S_{2.7}=(K_4/K_{2.7}-1)\ln(1+2.7/r'_{w,1.5}) \quad (11)$$

Having determined relative permeabilities of the oil, gas and water, and having determine a radial permeability profile of the formation, at 48 a productivity index may be calculated according to the following equations:

$$\Delta P=142.2(q\mu Bo/Kh)S \quad (12)$$

$$PI=0.00708Kh/(\mu Bo\ \ln(r_e/r_w)+S) \quad (13)$$

wherein ΔP is the skin excess pressure drawdown (in pounds per square inch), q is the fluid flow rate (in stock tank barrels per day), μ is the formation fluid viscosity (in centipoises), Bo is the formation volume factor (usually expressed for oil and in stock tank barrels per reservoir barrel) K is the permeability (in darcies), S is the dimensionless skin factor, PI is the productivity index (dimensionless), h is rock formation layer thickness (in feet), and $r_e$ is the effective drainage radius of the subsurface rock formation (in feet).

Methods according to the invention may enable estimating productivity of subsurface rock formations using essentially only nuclear magnetic resonance measurements, thus saving considerable time and expense of additional subsurface formation measurements and/or formation fluid sample taking or production testing.

While the invention has been described with respect to a limited number of example implementations, those skilled in the art, having benefit of this disclosure, will appreciate that other implementations can be devised which do not depart from the scope of the invention as disclosed herein. Accordingly, the scope of the invention should be limited only by the attached claims.

What is claimed is:

1. A method for estimating fluid productivity of a subsurface rock formation from within a wellbore drilled therethrough, comprising:
   measuring a nuclear magnetic resonance property of the formation at a plurality of lateral depths therein; and
   using the measured nuclear magnetic resonance property to estimate the productivity,
   wherein estimating the productivity comprises the steps of:
   determining porosity, permeability and irreducible water saturation of the formation from the nuclear magnetic resonance ("NMR") measurements;
   determining bulk volumes of water, oil and gas and saturations thereof from the NMR measurements;
   estimating viscosity of oil and gas oil ratio from the NMR measurements;
   estimating relative permeabilities of oil gas and water;
   estimating fractional water flow volume from the relative permeabilities;
   estimating skin factor from the NMR measurements; and
   estimating the productivity using the skin factor, the viscosity, a formation volume factor, and the relative permeabilities.

2. The method of claim 1 wherein the measured nuclear magnetic resonance property comprises transverse relaxation time.

3. The method of claim 1 further comprising estimating a permeability of the formation at each lateral depth from the measured nuclear magnetic resonance property.

4. The method of claim 3 wherein the measured nuclear magnetic resonance property comprises transverse relaxation time and the permeability is estimated from a logarithmic mean thereof.

5. The method of claim 1 further comprising repeating the measuring the nuclear magnetic resonance property and estimating a skin factor at a plurality of different longitudinal positions along the wellbore.

6. The method of claim 1, further comprising the steps of:
   determining a relationship between lateral depth and water saturation; and
   using the relationship between lateral depth and water saturation to estimate water saturation for a flushed zone.

7. A method for subsurface formation evaluation, comprising:
   moving a well logging instrument along a wellbore drilled through subsurface rock formations;
   while moving the instrument along the wellbore, measuring a nuclear magnetic resonance property of the formation at a plurality of lateral depths therein, the measuring the property including inducing a static magnetic field in the formations, inducing a pulsed radio frequency magnetic field in the formations at a plurality of different selected frequencies and measuring radio frequency energy from the formation induced by nuclear magnetic resonance phenomena at each of the selected frequencies; and
   using the measured nuclear magnetic resonance property to estimate fluid productivity of the formations,
   determining porosity, permeability and irreducible water saturation of the formation from the nuclear magnetic resonance ("NMR") measurements;
   determining bulk volumes of water, oil and gas and saturations thereof from the NMR measurements;
   estimating viscosity of oil and gas oil ratio from the NMR measurements;
   estimating relative permeabilities of oil gas and water;
   estimating fractional water flow volume from the relative permeabilities;
   estimating skin factor from the NMR measurements; and
   estimating the productivity using the skin factor, the viscosity, a formation volume factor, and the relative permeabilities.

8. The method of claim 7 wherein the measured property comprises transverse relaxation time.

9. The method of claim 7 further comprising estimating a permeability of the formation at each lateral depth from the measured nuclear magnetic resonance property.

10. The method of claim 9 wherein the measured nuclear magnetic resonance property comprises transverse relaxation time and the permeability is estimated from a logarithmic mean thereof.

11. The method of claim 7, further comprising the steps of:
    determining a relationship between lateral depth and water saturation; and
    using the relationship between lateral depth and water saturation to estimate water saturation for a flushed zone.

* * * * *